April 5, 1955     R. W. JOHNSON     2,705,498
ABSORBENT DRESSINGS
Filed June 11, 1954     3 Sheets-Sheet 1
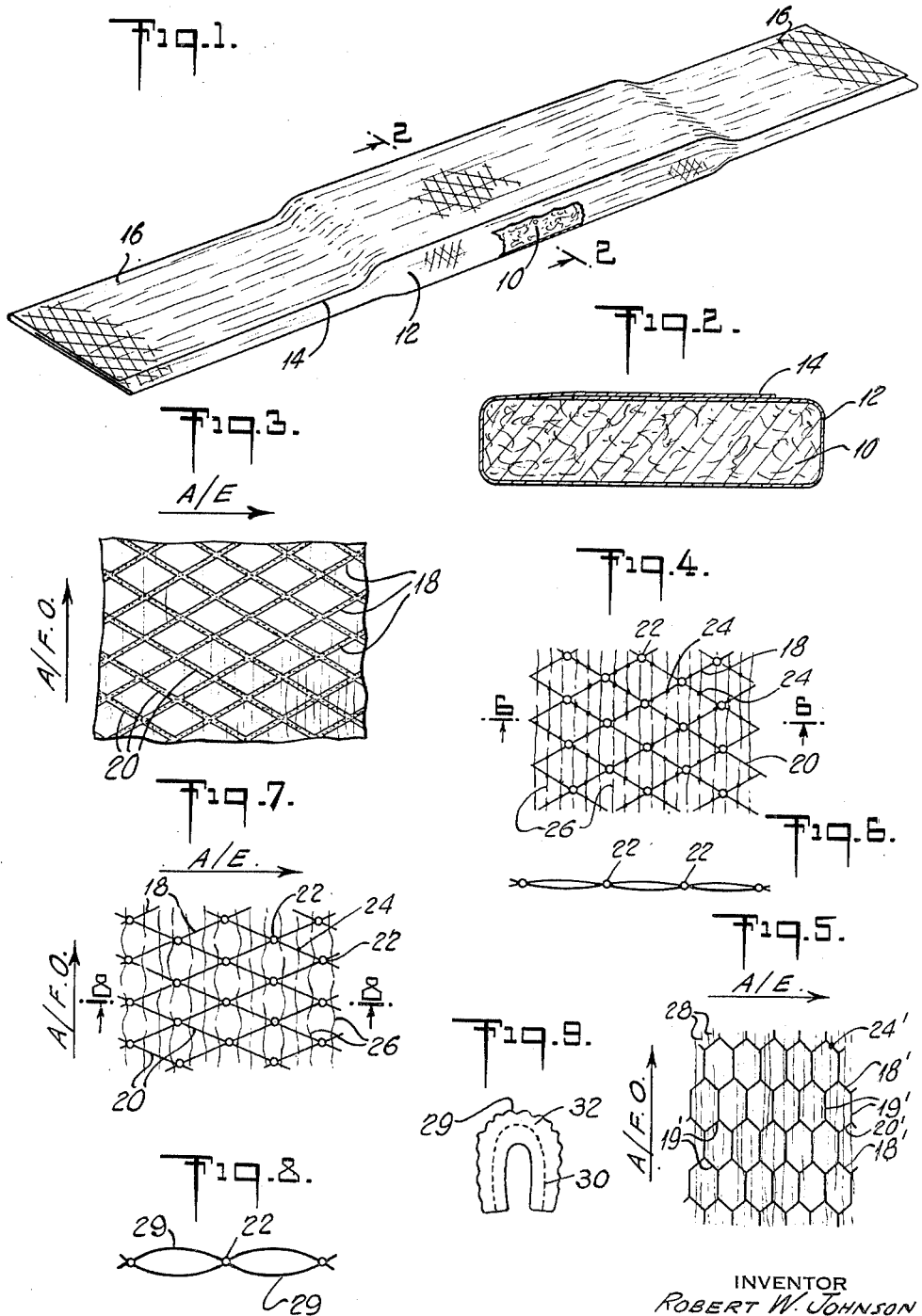
INVENTOR
ROBERT W. JOHNSON
BY
ATTORNEY

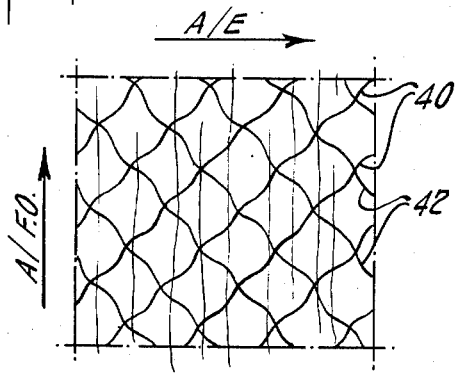
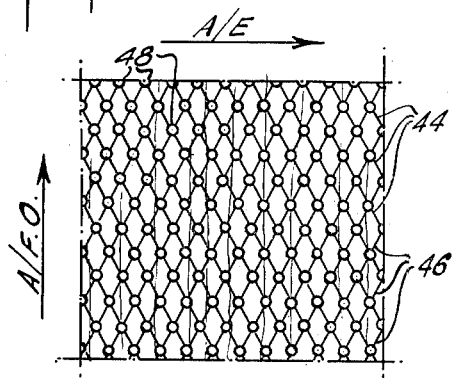
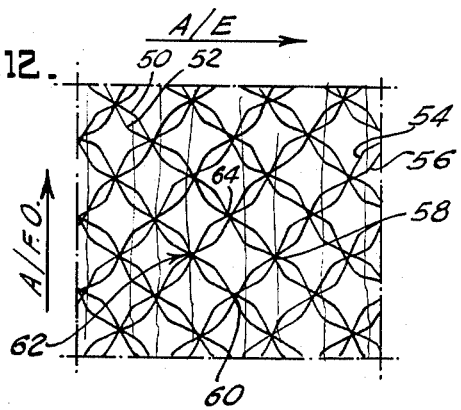
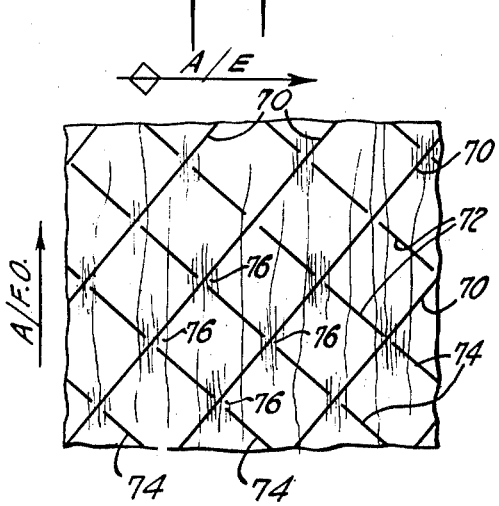
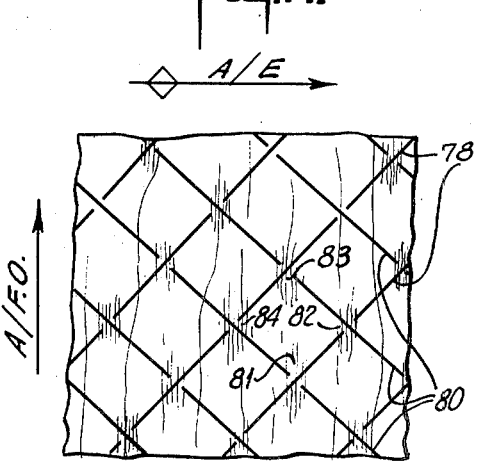

April 5, 1955 R. W. JOHNSON 2,705,498
ABSORBENT DRESSINGS
Filed June 11, 1954 3 Sheets-Sheet 3
Fig.15.
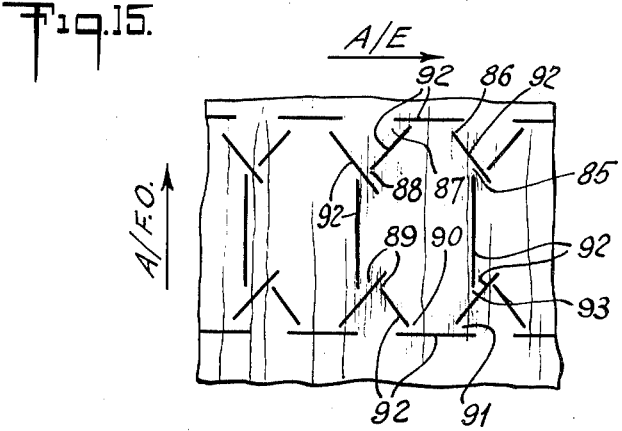
Fig.16.
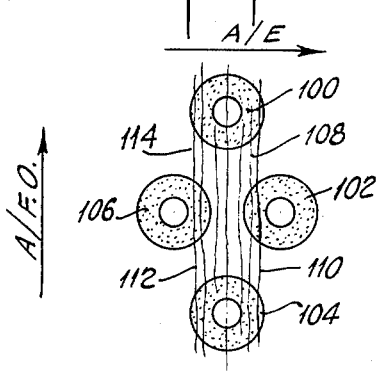
Fig.17.
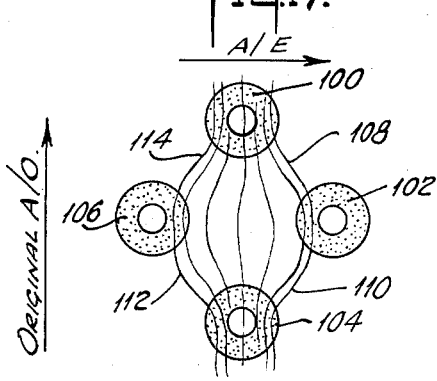
Fig.18.  Fig.19.  Fig.20.
      
Fig.21.  Fig.22.  Fig.23.
      
INVENTOR:
ROBERT W. JOHNSON
BY Benton A. Bull
ATTORNEY:

United States Patent Office 2,705,498
Patented Apr. 5, 1955

2,705,498

ABSORBENT DRESSINGS

Robert W. Johnson, Princeton, N. J., assignor to Personal Products Corporation, a corporation of New Jersey Application June 11, 1954, Serial No. 436,120

16 Claims. (Cl. 128—290)

This application is in part a continuation of my applications Serial No. 133,040, filed December 15, 1949, and Serial No. 280,964, filed April 7, 1952, and of my application with Irving S. Ness and Ronald V. Lints, Serial No. 280,965, filed April 7, 1952.

This invention relates to absorbent dressings, particularly those of the sanitary napkin type, and is directed to improving the softness, strength, comfort and absorptive effectiveness thereof.

Sanitary napkins customarily have an absorbent pad or core surrounded by a pervious cover or sheath which serves the twofold purpose of holding the core together and providing supporting or pinning tabs by which the napkin is secured to a belt. The materials formerly available for covers have not been completely satisfactory for an effective and comfortable cover. The most generally used cover material has been a woven gauze. This is uncomfortable because, among other reasons, the gauze is rough, especially where folded over the edges of the core. It becomes even rougher when the core is folded, and so chafes the wearer.

Attempts have been made to provide covers of non-woven short-fiber materials generally classified as paper, but these attempts have failed because the paper is not sufficiently pervious, and is either too weak or too rough and hence unsatisfactory.

Attempts have also been made to provide covers of sheet material made from non-woven textile fibers such as are shown in the Goldman Patent 2,039,312, but these have had the disadvantage that the sheet did not have sufficient crosswise strength to make a thoroughly reliable cover which would not rupture in use. One example of such attempt is shown in my British Patent 549,254. In napkins made as there disclosed, if the cover has been sufficiently thin for practical use and comfort, it has not been strong enough, particularly in the crosswise direction.

The present invention eliminates many of these and other disadvantages of previous napkins by improving the porosity, cross strength and softness of the cover of the napkin and provides a cover which cooperates with the core in a unique manner to become softer when the napkin is folded. Thus under the conditions of use which increased the harshness and roughness of gauze covers, my improved napkin is designed to increase in softness to the touch and general comfort to the wearer.

The following description and accompanying drawings show, for example only, several forms of napkins embodying my invention.

In the drawings:

Fig. 1 is a perspective view of one form of my improved napkin;

Fig. 2 is a section on the line 2—2 of Fig. 1;

Fig. 3 is a plan of a fragment of the cover shown in Fig. 1, being enlarged to show the structure approximately in actual size;

Fig. 4 is a diagrammatic plan of a portion of one form of cover as made, before being applied to the core, and not subject to lateral or crosswise stress;

Fig. 5 is a diagrammatic plan like Fig. 4 but showing another form of cover;

Fig. 6 is a diagrammatic section on the line 6—6 of Fig. 4;

Fig. 7 is a diagrammatic plan view of the cover in Fig. 4 or Fig. 5 when subjected to crosswise stress;

Fig. 8 is a diagrammatic section on the line 8—8 of Fig. 7;

Fig. 9 is a diagrammatic section of a napkin as folded between the legs in use, and showing on an exaggerated scale the action of the cover to increase its softness to the touch;

Figs. 10, 11 and 12 are plans of fragments of alternative covers for a sanitary napkin in accordance with the present invention;

Figs. 13–17 are diagrammatic plans like Figs. 4 and 5, but showing other forms of napkin cover; and Figs. 13–23 are diagrammatic plans of discrete binder area configurations that may be used instead of those illustrated in the other figures of the drawing.

Referring to the drawings, any suitable absorbent core 10 is surrounded by a cover 12 folded about the core and usually overlapped as indicated at 14. The core may be made of any known and suitable materials such as cotton fibers, paper, fluffed paper pulp and the like. Such cores are flexible and capable of being folded or bent into the form shown in Fig. 9, and they are resilient to a degree that tends to make them resume the form shown in Fig. 2 when the folding force is removed. This resilience is practically unavoidable, but not undesirable. This, and the thickness of the core creates problems of stretching or strength of the cover which affect safety and comfort in the cover. The cover extends beyond the ends of the core to form pinning tabs 16. So much has been done before my invention.

The sheet material used for my cover is formed preferably of a non-woven web of textile fibers, by which is meant fibers long enough to be spun into yarn and woven into cloth. Such fibers may, for example, have a predominant length of about half an inch or longer, that is the majority of the fibers in the web will be about half an inch long or longer although the web will include a minor proportion of shorter fibers and a minor proportion of longer. Preferably the fibers are predominantly aligned or oriented in one direction, for example by carding. A conventional lightweight card web, having a weight of about 100 to 200 grains per square yard, and so carded as to have, for example, 75% of the fibers substantially aligned in the direction of the length of the web, is suitable for my purpose. In such a web, perhaps 25% of the fibers will be "non-oriented" (i. e., more or less randomly arranged), although the major proportion (e. g., 75%) of the fibers will be substantially oriented with the length of the web. Cotton fibers are suitable, as are rayon and mixtures of various fibers. Preferably the fibers are absorbent, that is they readily take up and hold water when placed in contact with it.

In accordance with the present invention a web of oriented fibers is bonded to form a non-woven fabric napkin cover that is substantially inextensible in the direction of the fiber lay, but which is nevertheless laterally extensible or extensible in a direction normal to the direction of fiber orientation. Such properties may be imparted to an oriented web by bonding the web with a group or framework of binding members which hingedly coact with each other and with the fibers comprising the web to form multilateral or polygonal geometrical figures that are collapsible in a direction transverse to the direction of fiber orientation. Preferably this is attained by bonding the web with a binder pattern which coacts with the fibers, transversely of the fiber lay, on the well-known "lazy tongs" principle.

The "lazy tongs" principle is embodied in a host of familiar mechanical devices, including the ubiquitous "collapsible gates" commonly used by parents to keep their children confined within a given room or play area. So far as I am aware, however, the "lazy tong" principle has never been applied in the design of sanitary napkin cover, possibly because the application of such a principle to a catamenial device appears to be an incongruous association of ideas. Nevertheless, for reasons that will presently appear, the principle provides the basis for a significant improvement in the sanitary napkin art.

In accordance with a preferred embodiment of my invention the oriented fibers of the base web are bonded together into a non-woven fabric, by means of a plurality of binding members that coact with the fibers and with each other effectively to form a hingedly interconnected "lazy tong" diamond grid structure similar in action to that embodied in a diamond grid collapsible gate. The "lazy tong" binder structure in the napkin cover is so oriented relative to the direction of fiber orientation that "lazy tong" extension of the binder can take place in a direction substantially normal (i. e., perpendicular) to the direction of fiber orientation. This is conveniently accomplished by arranging the vertical and horizontal diagonals of the "lazy tong" diamonds so that they are respectively substantially normal to, and aligned with, the predominant direction of the fiber orientation in the web. Such orientation of the "lazy tong" binder structure permits "lazy tong" extension crosswise of the resulting oriented fabric. However, "lazy tong" extension lengthwise of the fabric is restrained by the oriented fibers composing the web which extend across the diagonals of the "lazy tong" diamonds that are aligned with the lengthwise direction of the fabric.

The fiber bonding system of the above type may conveniently be characterized as "transversely oriented lazy tong bonded non-woven fabric" or, more simply, as "lazy tong bonded non-woven fabric." The resultant napkin cover may aptly be described as a "laterally extensible lazy tong bonded non-woven napkin cover" or, more briefly, as a "lazy tong bonded non-woven napkin cover."

When a thus bonded lightweight web is stretched crosswise, it undergoes substantial lateral extension on the "lazy tong" principle, with two significant consequences. In the first place the "collapse" of the "lazy tong" binder pattern in one direction which characteristically accompanies extension of the "lazy tongs" in the cross direction tends to buckle or pucker some of the oriented fibers that are substantially parallel to the diminishing diagonals of the "lazy tong" diamond. The thus buckled oriented fibers are bent out of the plane of the binder pattern, with the development of a uniform, quilt-like pattern of tiny "pillows" on the surface of the fabric. This phenomenon may be termed the "quilting effect."

In the second place, a substantial proportion of the non-oriented fibers in the web (particularly those fibers which are substantially parallel to the increasing diagonals of the "lazy tong" diamonds) are subjected to tensional stress as the web is extended crosswise. Such non-oriented fibers are either ruptured or pulled out of the binder areas. The thus released ends of these non-oriented fibers tend to bend out of the plane of the fabric proper, forming a "nap" or "down" or "peach fuzz" on the surface of the fabric. This phenomenon may be termed the "peach fuzz effect." The "quilting effect" plus the "peach fuzz effect" substantially improve the softness of the fabric when it is stretched crosswise. Thus properly oriented "lazy tong" bonding of an oriented web of textile fibers in accordance with the present invention makes it possible to provide a superior and much more comfortable napkin cover.

In order more clearly to disclose and illustrate the nature of the present invention and various ways in which the principles involved may be carried into practice, several specific embodiments will hereinafter be described in considerable detail. It should be clearly understood, however, that this is done solely by way of example and not for the purpose of limiting either the spirit or the scope of the appended patent claims.

*Example I*

One way of bonding the web on the "lazy tongs" principle is to arrange two sets of binding members 18 and 20 as shown in Fig. 4, diagonally of the sheet and crossing one another to form "lazy tong" diamonds or parallelograms whose diagonals or axes are parallel to the predominant alignment of the fibers and transverse thereto, respectively. The binding members are secured to one another where they cross at points 22 and they are secured to all the fibers they cross as indicated by the points 24, in Fig. 4. Thus the binding members form hingedly interconnected, diamond-shaped "lazy tong" parallelograms, each of which acts as a frame supporting fibers laid across it, and which can be flattened by pulling opposite corners crosswise of the sheet. In this flattening, the binding members pivot or hinge at points 22. Preferably the binding members are elastic, and when they are, they resiliently pivot at points 22. They can be formed conveniently by printing rubber latex, polyvinyl acetate or other elastic adhesive through the thickness of the web and along lines forming the "lazy tong" diamond pattern, this printing being done, for example, as disclosed in the Goldman Patent 2,039,312. This operation joins or binds all the fibers of the web to the binding member or adhesive line wherever this crosses the fibers, and joins the adhesive lines to each other at their points of intersection 22.

When the cover is stretched across the napkin the diamonds are flattened. Thus the axis of "lazy tong" extension (indicated in Figs. 3, 4 and 5 by the arrow labeled "A./E.") is normal to the axis of fiber orientation (indicated in the same figures by the arrow labeled "A./F. O."). It is uncertain whether this flattening action is due to resilient pivoting at the corners, or resilient bending of the sides near the corners, or both. However, I prefer to depend on this bending and pivoting action to flatten the diamond without stretching the sides of the diamond linearly, even though the binding members be elastic. This is because binding members formed as described will stand a limited amount of linear stretching without rupture or without passing the elastic limit. However, a great amount of bending is permissible.

Alternatively, the binder framework may be formed by printing through the web other figures, preferably contiguous, of adhesive (preferably elastic), the figures being of such form that they can be stretched crosswise of the napkin (and correspondingly shortened lengthwise) by bending or hinging of the sides or both.

*Example II*

An example of one such alternative or modified "lazy tong" form of binding is shown in Fig. 5. The binding lines 18', 19', and 20' intersect at points 22' to form hexagons in which no lines of the hexagon run perpendicular to the length of the sheet. They are joined to the fibers at 24'.

These hexagons permit stretching of the sheet crosswise of the napkin by stretching the hexagons solely through bending of their sides and pivoting of the joints, without linearly stretching the sides. These hexagons may be regarded as "diamonds" extended lengthwise of the axis of fiber orientation. The vertical sides of the hexagons, as shown, for example, in Fig. 5, could be made of any desirable length (not exceeding one-half the average fiber length) and if reduced to zero length, the "hexagon" in this limiting case would be a "diamond." In any event, the axis of extension (A./E.) of the modified form of "lazy tong" diamond structure of Fig. 5 is normal to the axis of fiber orientation (A./F. O.).

Of these two embodiments shown in Examples I and II, I prefer the embodiment illustrated in Fig. 4 because the diamond design has advantages over the hexagonal (or "modified diamond" design). The diamonds pucker the fibers more easily and form more comfortable pillows in the fabric when it is stretched crosswise.

Preferably also the maximum distance (in the direction of the length of the sheet) between binding members, i. e., between points 22, is not more than half the length of the predominant proportion of fibers, so that each aligned fiber of this predominant group is bound to other fibers at two points. In this way the sheet is made up of continuous filament running from end to end of the sheet, each such continuous filament being constituted by a series of fibers joined end to end by points on the adhesive lines 18 or 20.

Alternatively, if the sheet is made of artificial or synthetic fibers 28, such as rayon, which can be made in continuous lengths, fibers are combed or laid out straight in a uniform thin web and joined by printing as above described. This is diagrammatically represented in Fig. 5. In such case the sheet is made of integral (not jointed) filaments running from end to end.

Figs. 7 and 8 show the action of the fibers when the sheet is stretched in the direction of its width. The "lazy tong" parallelogram or hexagonal frames formed by the binding members 18 and 20, or 18' and 20', are lengthened across the sheet and shortened along the sheet. This is made possible by the hinging action of the joints 22 or 22' of elastic material. At the same time the individual fibers, being secured at the joints 24 or 24', are relaxed and puckered as indicated in Fig. 7. This causes them to hump into little pillows 29 as shown in Fig. 8.

When a cover is wrapped about a core and the core is folded as shown in Fig. 9, the core bends along a neutral plane which does not change its width, as is known about bent bodies of finite thickness. All planes through the core which are outside the neutral plane 30 increase in length, or are stretched. Consequently the outside surface 32 of the cover 12 (with reference to the fold) is stretched across its width. This puckers the fibers and forms the pillows 29 wherever the sheet is stretched. This raising of little bunches of fibers which are loose except for being secured at their ends increases the softness to the touch of the napkin cover and makes it more comfortable.

In addition, the arrangement of binding lines or members very greatly increases the cross strength of the fabric and provides a fabric which is elastic across its width. As the sheet is stretched crosswise the "lazy tong" diamonds flatten and permit displacement of the fibers without rupture, that is without pulling any fiber loose from its fastening to another fiber. Also the diagonal arrangement of the binding lines permits marked stretch of the sheet without materially stretching the binding lines themselves. The inherent elasticity of the binding members and of the fibers tends to restore the fibers to their original position when the crosswise stretch is removed.

Although the sheet may be stretched crosswise, it is substantially inextensible lengthwise, within the limits of the forces to which it is ordinarily subjected. This is because the sheet is constituted by filaments, integral or joined, running continuously the length of the sheet. The only extensibility lengthwise is that permitted by the inherent elasticity of inherent resistance to stretch of the fibers. In a sheet the size of a napkin cover there are enough fibers to prevent any appreciable lengthwise stretch by the forces ordinarily applied in the use of a napkin.

Thus the improved arrangement of "lazy tong" bonded cover, in cooperation with the action of the resilient core, provides a napkin of increased comfort, and one which is secure due to the crosswise elasticity of the cover and its inextensibility lengthwise.

Preferably the binding lines are very narrow (of the order of twenty thousandths of an inch), and are as far apart as fiber length and practical formation of the pillows permits (of the order of a quarter inch), so that a great proportion of the area of the sheet is constituted by pervious and absorbent fibers.

The arrangement of the binder lines to form complete enclosures around areas of absorbent fiber also prevents flow of fluids along the sheet and causes the fluids to strike through the cover to be absorbed by the core. This tends to prevent side flow which would otherwise wet the cover and make the napkin uncomfortable.

Other binder arrangements or groups which also exhibit a similar "lazy tongs" action when the web is stretched crosswise are illustrated in Figs. 10 to 17.

*Example III*

In Fig. 10 the binder comprises two sets of parallel wavy lines or sine curves 40 and 42, diagonally disposed across the fibers, the first set 40 being obliquely disposed, but in the opposite sense or direction, with respect to the second set 42. This is essentially a wavy line variation of the "lazy tong" diamond design discussed above. Here also the axis of "lazy tong" extension (A./E.) is normal to the axis of fiber orientation (A./F. O.) as shown in Fig. 10.

*Example IV*

In Fig. 11, the modified diamond pattern shown therein comprises two sets of parallel diagonal lines of binders 44 and 46, with doughnut-shaped or annular pivotal binder areas 48 located at the points of intersection. The axis of "lazy tong" extension (A./E.) again is normal to the axis of fiber orientation (A./F. O.).

*Example V*

In Fig. 12, the "parallelogram" connecting the points 58, 60, 62, and 64 is formed by four sets of diagonal wavy lines 50, 52, 54, and 56, arranged in pairs. The diagonal line 50 is the mirror image or reflection of line 52, while the diagonal line 54 is the reflection of line 56. Upon extension of the web in the cross direction, the "parallelogram" (58, 60, 62 and 64) flattens out, with basically the same "lazy tongs" action as with the diamond pattern of Fig. 4, with the axis of "lazy tong" extension (A./E.) normal to the axis of fiber orientation (A./F. O.).

*Example VI*

In Fig. 13 the parallelograms or diamonds comprising the "lazy tong" structure are formed (a) by one set of parallel continuous lines 70 extending diagonally from the lower left-hand corner to the upper right-hand corner in the drawing; (b) by a second set of parallel discontinuous or broken lines 74 extending diagonally from the lower right-hand corner to the upper left-hand corner in the drawing; and (c) by groups or bundles of oriented fibers 76 which interconnect the ends of the individual segments in the broken lines 74 with adjacent portions or areas in the continuous lines 70. These bundles of oriented fibers 76 serve in effect as corner fiber hinges, pivot points or articulations in the hinged or articulated "lazy tong" diamonds. As shown in Fig. 13 the diagonals of the "lazy tong" diamond structures are respectively normal to and aligned with the axis of fiber orientation. In the drawing the axis of fiber orientation is indicated by the arrow labeled "A./F. O.". The axis of expansion of the "lazy tong" structure, indicated in the drawing by the arrow labeled "A./E.," is normal to the axis of fiber orientation (A./F. O.).

*Example VII*

The binder pattern of Fig. 14 is similar to that of Fig. 13 except that in the case of Fig. 14 two sets of parallel broken or discontinuous binder lines 78 and 80 are employed. The segments of one set of parallel broken lines are positioned in the intersegmental spaces of the other set of diagonal lines, which latter are inclined in an opposite sense or direction relative to the first set. The groups or bundles of oriented fibers (81, 82, 83 and 84) interconnecting the end portions of the segments in one set of broken lines with the center portions of the segments in the other set of broken lines provide corner fiber hinges, pivot hinges or articulations in the articulated "lazy tong" diamond structure. The diagonals of the "lazy tong" diamond structure are respectively normal to and parallel with the axis of fiber orientation (A./F. O.). The axis of expansion (A./E.) of the "lazy tong" structure is normal to the axis of fiber orientation (A./F. O.).

*Example VIII*

Fig. 15 represents a broken or discontinuous line hexagonal grid pattern, each hexagon being formed by eight segments 92 plus the interconnecting lengths of oriented fibers (85 to 93 incl.) which form the corner fiber hinges, pivot points or articulations holding the articulated or hinged hexagons together during lateral extension. The axis of expansion (A./E.) of this modified form of "lazy tong" structure is normal to the axis of fiber orientation (A./F. O.).

*Example IX*

Figs. 16 and 17 illustrate still another "lazy tong" bonded napkin cover, before (Fig. 16) and after (Fig. 17) the fabric has been stretched in the cross direction. In these two figures the "lazy tong" structures are formed partly by physically separated or discrete substantially completely symmetrical binder areas and partly by bundles of oriented fibers interconnecting the discrete binder areas. In this example, however (as contrasted with those described above), the interconnecting bundles of oriented fibers form, in effect, the sides of the "lazy tong" parallelograms (rather than the pivot points) while the discrete binder areas constitute, in effect, the pivot points (rather than the sides of the diamond structure).

Thus the binder areas 100, 102, 104 and 106 constitute, in effect, the pivot points or corners of the "lazy tong" diamond structure while the lengths of oriented fibers (diagrammatically indicated at 108, 110, 112 and 114) interconnecting such pivot points, serve as the lateral elements of the "lazy tong" diamond structure. As shown in Figs. 16 and 17, the diagonals of the "lazy tong" diamonds are respectively normal to and aligned with the axis of fiber orientation (A./F. O.), and the axis of expansion (A./E.) of the "lazy tong" structure is normal to the axis of fiber orientation (A./F. O.).

Dynamically the "lazy tong" system illustrated in Figs. 16 and 17 behaves basically in the same manner as the "lazy tong" system of all the preceding examples wherein the lateral elements of the "lazy tong" structures were formed either by linear or segmental binder areas. The binder areas 100, 102, 104 and 106 of Figs. 16 and 17, although illustrated as being annular or ring-shaped in configuration, need not be limited to this particular geometrical form. Thus, for example, the individual binder areas may take the form of squares (Fig. 18), rectangles (Fig. 19), segments (Fig. 20), triangles (Fig. 21), hexagons (Fig. 22), disc-shaped spots (Fig. 23), or any other suitable configuration.

In the embodiments of the invention of the discontinuously bonded types described in connection with Figs. 13–23, certain specific conditions are necessary to carry out basic "lazy tong" bonding principles of the present invention. In the first place, the area of the fabric covered by the discrete binder areas should not exceed about 35% of the total lateral surface of the fabric. Preferably the binder area should not cover more than about 5% to 25% of the total lateral surface of the napkin cover. If the 35% figure is exceeded, the "lazy tong" action of the napkin cover will be substantially completely immobilized or frozen; the fabric will be substantially inextensible when subjected to cross tension. Secondly, in the case of embodiments of the type shown in Figs. 16–23, the discrete binder areas should be arranged in a staggered pattern with their centers located approximately at the intersections of an imaginary diamond grid pattern. Thirdly, the discrete binder areas should be so dimensioned and juxtaposed relative to each other as to be interconnected by the fibers of the web into a "lazy tong" diamond grid type of structure. This means with a highly oriented base web that the lateral width (i. e., in a direction normal to the axis of fiber orientation) of any given binder area in a given horizontal row should exceed (preferably by about 0.04 to about 0.10 of an inch) the lateral distance separating the adjacent-most binder areas in the horizontal rows immediately above and below the given row. In other words, the binder areas are arranged in both staggered and overlapping relationship relative to each other, the "overlap" on each side of a given area being of the order of 0.02 to 0.05 of an inch. Thus, the right-hand side of a given area in Fig. 16, for example, will be connected by a bundle of oriented fibers with the left-hand sides of the adjacent-most binder areas in the rows immediately above and immediately below the given areas and located to the right of the given areas. Conversely, the left-hand side of the given area will be connected by a bundle of oriented fibers with the right-hand sides of the adjacent-most areas in the rows immediately above and below and located to the left of the given areas. This "overlap" condition is necessary so that the bundle of oriented fibers connecting adjacent-most binder areas in the rows above and below the given area may serve either as the corner hinges (in the case of Figs. 13–15) or as the lateral elements (in the case of Figs. 16 and 17) of the "lazy tong" structure. Lastly, the diagonals of the "lazy tong" diamond structures formed either by continuous binder lines, segments or a staggered overlapping pattern of "spots" should be respectively approximately normal to and aligned with the axis of fiber orientation of the fabric.

Certain aspects of the embodiments diagrammatically illustrated in connection with Figs. 13 through 23 inclusive are more particularly described and claimed in the copending applications of Petterson and Ness, Serial No. 280,962; Ness, Lints and Petterson, Serial No. 280,963; and Johnson, Ness and Lints, Serial No. 280,965, all filed April 7, 1952; and of Ness, Lints and Petterson, Serial No. 286,482 and Serial No. 286,481, both filed May 7, 1952. For a still more detailed description of these embodiments, reference should be made to these applications.

Having now described my invention in specific detail and exemplified several ways in which it may be carried into practice, it will be apparent to those skilled in the art that innumerable variations, modifications and extensions of the basic principles involved may be made without departing from the spirit or scope thereof. Thus, for example, although I have illustrated the invention by specific reference to a sanitary napkin, it is apparent that the principles involved may be utilized in the manufacture of other absorbent dressings by replacing the gauze or woven fabric that overlies and in some cases surrounds an absorbent pad or core with a cover sheet composed of "lazy tong" bonded nonwoven fabric as herein described. Such improved covers may, for example, replace the gauze covers or outer layers of gauze in surgical combines, hospital underpads, disposable diapers, atomic burn dressings and, in general, in surgical dressings of all types wherein a cover, wrapper, or outer layer of soft as well as inexpensive fabric is desired. I therefore intend to be limited only in accordance with the appended patent claims.

I claim:

1. An absorbent dressing comprising in combination an absorbent body and a pervious cover therefor, said cover including a sheet of fibers oriented predominantly in one direction, said fibers being secured together by a plurality of binder members coacting with the fibers and each other effectively to form hingedly interconnected "lazy tongs" structures whose diagonals are respectively normal to and aligned with said predominant direction of fiber orientation.

2. An absorbent dressing comprising in combination an absorbent body and a pervious cover for said body, said cover comprising a web of textile fibers predominantly aligned in one direction, the fibers being bound together on the "lazy tong" principle by a bonding material over a plurality of areas of the web and being unbound over the remaining areas of the web, the relative arrangement of the bound and unbound areas being such that the axis of "lazy tong" extension is normal to the predominant direction of alignment of the fibers in said web, so as to impart to the web the property of being recoverably stretchable transversely to the predominant direction of aiignment of the fibers independently of any stretchability of the bonding material.

3. An absorbent dressing comprising in combination an absorbent body and a pervious cover for said body, said cover comprising a web of textile fibers predominantly aligned in one direction, the fibers being bound together by a bonding material over a plurality of areas of the web and being unbound over the remaining areas of the web, the relative arrangement of the bound and unbound areas being such as effectively to form hingedly interconnected "lazy tong" structures whose diagonals are respectively normal to and aligned with the predominant direction of alignment of the fibers of the web, thereby imparting to the web the property of being recoverably stretchable transversely to said fiber alignment direction independently of any stretchability of the bonding material.

4. A sanitary napkin comprising in combination a relatively thick, flexible, absorbent core and a pervious cover surrounding the core, the cover being substantially inextensible in the direction of the length of the napkin and substantially extensible in the direction of the width of the napkin, said cover including a sheet of fibers oriented predominantly in the direction of the length of the napkin, said fibers being secured together by a plurality of binder members coacting with the fibers and each other effectively to form hingedly interconnected "lazy tongs" structures whose diagonals are respectively normal to and aligned with the direction of fiber orientation and the length of said napkin.

5. A sanitary napkin comprising in combination a relatively thick, flexible, absorbent core and a pervious cover surrounding the core, said cover including a sheet of textile length fibers oriented predominantly in the direction of the length of said napkin and bonded together by a plurality of binder members coacting with the fibers and with each other effectively to form hingedly interconnected "lazy tong" structures comprising collapsible parallelograms whose diagonals are respectively normal to and aligned with the direction of fiber orientation and the length of said napkin, said cover being characterized by being substantially inextensible in the direction of the length of the napkin and substantially extensible in the direction of the width of the napkin, and by its capacity, upon extension across the fibers, to develop a multiplicity of tiny "pillows" of puckered fibers extending out of the plane of the fabric proper.

6. A sanitary napkin comprising in combination a relatively thick, flexible, absorbent core and a pervious cover surrounding the core, the cover being substantially inextensible in the direction of the length of the napkin and substantially extensible in the direction of the width of the napkin, said cover including a sheet of fibers arranged predominantly in the direction of the length of the napkin, said fibers being secured together by a plurality of binder members hingedly interconnected and coacting with the fibers and with each other effectively as interconnected, collapsible parallelograms whose diagonals are, respectively, transverse to and aligned with the length of said napkin.

7. A sanitary napkin comprising in combination a relatively flexible, absorbent core and a pervious cover surrounding the core, said cover comprising a lightweight web or sheet of nonwoven textile fibers, the major proportion of which fibers are oriented substantially in the direction of the length of said napkin and bonded together into a nonwoven fabric by a plurality of hingedly interconnected binding members infused locally into the body of said web and coacting with the web and with each other effectively as interconnected, collapsible parallelograms whose diagonals are, respectively, transverse to and aligned with the length of said napkin, said cover being substantially extensible in the direction of the width of the napkin and characterized by its capacity upon extension across the oriented fibers to develop a multiplicity of uniformly disposed, tiny "pillows" of resiliently puckered fibers extending out of the plane of the fabric proper.

8. A sanitary napkin comprising in combination a flexible, absorbent core and a pervious cover surrounding the core, said cover including a sheet of textile length fibers oriented predominantly in the direction of the length of said napkin and bonded together by a plurality of binder members coacting with the fibers and with each other effectively to form hingedly interconnected "lazy tong" structures comprising collapsible parallelograms whose diagonals are respectively normal to and aligned with the direction of fiber orientation and the length of said napkin, said cover being characterized by being substantially inextensible in the direction of the length of the napkin and substantially extensible in the direction of the width of the napkin.

9. A sanitary napkin comprising in combination a relatively thick, flexible, absorbent core and a pervious cover surrounding the core, the cover being substantially inextensible in the direction of the length of the napkin and substantially extensible in the direction of the width of the napkin, said cover including a sheet of fibers arranged predominantly in the direction of the length of the napkin, said fibers being secured together along a plurality of lines substantially forming parallelograms whose diagonals are aligned with the fibers and transverse to the fibers respectively.

10. A sanitary napkin comprising in combination a relatively thick, flexible, absorbent core and a pervious cover surrounding the core, the cover being substantially inextensible in the direction of the length of the napkin and substantially extensible in the direction of the width of the napkin, said cover including a sheet of fibers arranged predominantly in the direction of the length of the napkin, said fibers being secured together along a plurality of lines forming parallelograms whose diagonals are aligned with the fibers and transverse to the fibers respectively, the maximum distance apart along the length of the fibers of adjacent points on said lines being not greater than half the predominant length of the fibers.

11. A sanitary napkin comprising in combination a relatively thick, flexible, absorbent core and a pervious cover surrounding the core, the cover being substantially inextensible in the direction of the length of the napkin and substantially extensible in the direction of the width of the napkin, said cover including a sheet of fibers arranged predominantly in the direction of the length of the napkin, said fibers being secured to a plurality of binding members, the binding members being pivotally secured to one another and arranged in parallelograms whose diagonals are aligned with the fibers and transverse to the fibers respectively.

12. A sanitary napkin comprising in combination a relatively thick, flexible, absorbent core and a pervious cover surrounding the core, the cover being substantially inextensible in the direction of the length of the napkin and substantially extensible in the direction of the width of the napkin, said cover including a sheet of fibers arranged predominantly in the direction of the length of the napkin, said fibers being secured to a plurality of elastic binding members, the binding members being pivotally secured to one another and arranged in parallelograms whose diagonals are aligned with the fibers and transverse to the fibers respectively.

13. A sanitary napkin comprising in combination a relatively thick, flexible, absorbent core and a pervious cover surrounding the core, the cover being substantially inextensible in the direction of the length of the napkin and substantially extensible in the direction of the width of the napkin, said cover including a sheet of fibers arranged predominantly in the direction of the length of the napkin, said fibers being secured to two sets of continuous binding members, the binding members of each set being arranged diagonally with respect to the length of the napkin and crossing the binding members of the other set, the binding members being secured to each other at the points of crossing.

14. A sanitary napkin comprising in combination a relatively thick, flexible, absorbent core and a pervious cover surrounding the core, the cover being substantially inextensible in the direction of the length of the napkin and substantially extensible in the direction of the width of the napkin, said cover including a sheet of fibers arranged predominantly in the direction of the length of the napkin, said fibers being secured to a plurality of impervious binding members, the binding members being adapted to prevent absorptive transmission of liquid along the cover and being pivotally secured to one another and arranged in parallelograms whose diagonals are aligned with the fibers and transverse to the fibers respectively.

15. A sanitary napkin comprising in combination a relatively thick, flexible, absorbent core and a pervious cover surrounding the core, the cover being substantially inextensible in the direction of the length of the napkin and substantially extensible in the direction of the width of the napkin, said cover including a sheet of fibers arranged predominantly in the direction of the length of the napkin, said fibers being secured together along a plurality of lines forming geometric figures having pairs of parallel sides, at least two of said pairs being obliquely disposed with respect to the length of the napkin and none of said pairs being perpendicular to the length of said napkin.

16. A sanitary napkin comprising in combination a relatively thick, flexible, absorbent core and a pervious cover surrounding the core, the cover being substantially inextensible in the direction of the length of the napkin and substantially extensible in the direction of the width of the napkin, said cover including a sheet of fibers arranged predominantly in the direction of the length of the napkin, said fibers being secured together by a series of binder lines extending diagonally across said fibers and a second series of binder lines also extending diagonally across said fibers but in the opposite sense or direction.

References Cited in the file of this patent

UNITED STATES PATENTS

| 2,039,312 | Goldman | May 5, 1936 |
| 2,207,279 | Alderfer | July 9, 1940 |
| 2,407,548 | Goldman | Sept. 10, 1946 |
| 2,498,197 | Baxter | Feb. 21, 1950 |
| 2,564,689 | Harwood et al. | Aug. 21, 1951 |

FOREIGN PATENTS

| 549,254 | Great Britain | Nov. 12, 1942 |